United States Patent
Nakura et al.

(10) Patent No.: US 6,655,855 B2
(45) Date of Patent: Dec. 2, 2003

(54) OPTICAL CONNECTOR AND SHIELD CONNECTOR THEREFOR

(75) Inventors: Yuji Nakura, Nagoya (JP); Hitoshi Imazu, Nagoya (JP); Kazuhiro Asada, Nagoya (JP)

(73) Assignees: Autonetworks Technologies, Ltd., Nagoya (JP); Sumitomo Wiring System, Ltd., Mie (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/042,174

(22) Filed: Jan. 11, 2002

(65) Prior Publication Data

US 2002/0102074 A1 Aug. 1, 2002

(30) Foreign Application Priority Data

| Jan. 18, 2001 | (JP) | 2001-010027 |
| Apr. 3, 2001 | (JP) | 2001-104431 |
| Apr. 5, 2001 | (JP) | 2001-106866 |

(51) Int. Cl.[7] .................................................. G02B 6/36
(52) U.S. Cl. ..................... 385/92; 385/53; 385/88; 385/89; 385/90
(58) Field of Search .......................... 385/53, 88, 92, 385/89–90

(56) References Cited

U.S. PATENT DOCUMENTS

| 5,337,396 A | * | 8/1994 | Chen et al. | 385/92 |
| 6,072,613 A | * | 6/2000 | Henningsson et al. | 359/152 |
| 6,193,420 B1 | * | 2/2001 | Sikorski, Jr. | 385/55 |
| 6,206,582 B1 | * | 3/2001 | Gilliland | 385/92 |
| 6,332,720 B1 | * | 12/2001 | Shimaoka et al. | 385/88 |
| 6,358,066 B1 | * | 3/2002 | Gilliland et al. | 439/76.1 |
| 6,407,932 B1 | * | 6/2002 | Gaio et al. | 361/818 |
| 6,431,765 B1 | * | 8/2002 | Chen et al. | 385/92 |
| 6,461,058 B1 | * | 10/2002 | Birch et al. | 385/92 |
| 6,499,889 B1 | * | 12/2002 | Shirakawa et al. | 385/88 |
| 2002/0197026 A1 | * | 12/2002 | Kato et al. | 385/92 |

FOREIGN PATENT DOCUMENTS

| JP | 61016666 A | * | 1/1986 | H04N/1/00 |
| JP | U 5-90412 | | 12/1993 | |
| JP | A 2001-296457 | | 10/2001 | |
| JP | 2002243978 A | * | 8/2002 | G02B/6/36 |

* cited by examiner

*Primary Examiner*—Brian Healy
*Assistant Examiner*—Daniel Petkovsek
(74) *Attorney, Agent, or Firm*—Oliff & Berridge, PLC

(57) ABSTRACT

An optical connector is housed in a connector housing member 20 while an optical element 1 is housed in a shield case 10. The optical connector includes a connector housing member 20 which is made of resin and has a case storage recess 25 capable of housing the shield case 10, and a metal heatsink 30 which is attached to the connector housing member 20 so as to close a rear opening of the case storage recess 25. The heatsink section 30 comes into contact with the shield case 10 and is fitted into a rear opening of the case storage recess 25 while being exposed to the outside.

17 Claims, 12 Drawing Sheets

OPTICAL CONNECTOR AND SHIELD CONNECTOR THEREFOR

BACKGROUND OF THE INVENTION

1. Field of the Invention

The present invention relates to an optical connector and shield case therefor which are employed in OA and FA applications and in the field of optical communication.

2. Description of the Related Art

As measures against noise, an optical connector having a built-in optical element has hitherto employed a construction for incorporating an optical element in a connector housing made of conductive resin or for containing in insulation resin a metal case having an optical element incorporated therein.

The former optical connector suffers from a problem of an inadequate noise resistance characteristic of a connector housing made of conductive resin.

The problem suffered by the latter optical connector is that, since an optical element, acting as a heat-emitting member, is held in a resin-made housing having comparatively low thermal conductivity, heat is apt to remain in the housing. In order to maintain stable operation of the optical element, limitation must be imposed on an operating speed, which is problematic.

SUMMARY OF THE INVENTION

The present invention aims at providing an optical connector having noise resistance and a superior thermal radiation characteristic, as well as a shield case for the optical connector.

In order to achieve the above object, the present invention provides an optical connector comprising: a shield case capable of storing an element main body section of an optical element; a connector housing member which retains and stores the shield case in a case storage recess formed therein; and a heatsink section which is provided over and across a rear surface of the shield case and is incorporated into the connector housing member while being exposed to the outside from the connector housing member.

Preferably, the heatsink section may be incorporated into the connector housing member so as to hold down and retain the shield case in the case storage recess from behind.

Preferably, the heatsink section may be formed from material which is superior in heat conductivity to that constituting the connector housing member. Alternatively, the heatsink section may be formed from metal material, or the heatsink section may have a plurality of heatsink projections projecting outward.

Preferably, the heatsink section may be formed integrally with the shield case.

The present invention also provides an optical connector capable of storing an element main body section of an optical element in a connector housing, wherein the entirety of the connector housing is formed from metal material.

In this case, an area of the connector housing located behind the optical element may have a plurality of heatsink projections projecting outward. Alternatively, a shield case capable of storing the element main body section may be retained and housed in the connector housing.

The present invention provides an optical connector comprising: a shield case capable of storing therein an element main body section of an optical element; and a connector housing member which has a case storage recess formed therein and retains and stores the shield case in the case storage recess while at least a rear surface of the connector housing member is exposed to the outside.

The present invention provides an optical connector capable of being mounted on a board, comprising: a connector housing member having a case storage recess formed therein; a case main body section which is formed so as to be able to store an element main body section of an optical element and is housed in the connector housing member; and a plurality of lead sections which extend from the case main body section toward the outside of the connector housing member and can be connected to a ground trace formed on the board.

The present invention provides an optical connector shield case capable of being mounted on a board, comprising: a case main body section which is formed so as to be able to store an element main body section of an optical element and is retained and housed in a connector housing member; and a plurality of lead sections which extend from the case main body section and can be connected to a ground trace formed on the board.

The present invention provides an optical connector including a case storage recess formed in a connector housing member; a rear surface of the connector housing member facing an opening formed in the case storage recess; and a shield case storing an element main body section of an optical element, wherein the shield case is retained and housed in the case storage recess, and heat developing in the optical element is dissipated to the outside through the opening, the connector further comprising: a positioning projection formed in the shield case in a direction orthogonal to a direction in which insertion to the case storage recess is to be effected; and a guide groove section which is capable of slidably engaging with the positioning projection and is formed in a circumferential wall section extending from the opening of the connector housing member to the case storage recess, wherein the positioning projection is slidably engaged with the guide groove section, so that the shield case is inserted into the case storage recess while being positioned in at least one direction orthogonal to the direction in which the shield case is to be inserted.

In this case, the guide groove may pass through the case storage recess, and while the shield case is housed in the case storage recess, the positioning projection may preferably be exposed to the outside of a connector housing member by way of the through portion of the case storage recess.

The present invention provides an optical connector which is incorporated into a connector housing member while an element main body section of an optical element is housed in a shield case and which dissipates heat of the optical element by way of the shield case, the connector comprising:

an elastic member which is interposed between the element main body section of the optical element and a case main body section of the shield case capable of storing the element main body section while remaining in at least partial intimate contact with an exterior surface of the element main body section and with an interior surface of the case main body section.

Preferably, the elastic member may be formed from a conductive, magnetic, and elastic material.

The present invention provides an optical connector shield case which is incorporated into a connector housing member while an element main body section of an optical element is housed in a shield case and which dissipates heat of the optical element by way of the shield case, the connector comprising: an elastic member which is interposed between the element main body section of the optical element and a case main body section of the shield case capable of storing the element main body section while remaining in at least partial intimate contact with an exterior surface of the element main body section and with an interior surface of the case main body section.

DETAILED DESCRIPTION OF THE PREFERRED EMBODIMENTS

Now, a description will be given in more detail of preferred embodiments of the invention with reference to the accompanying drawings.

[First Embodiment]

Figure 1:
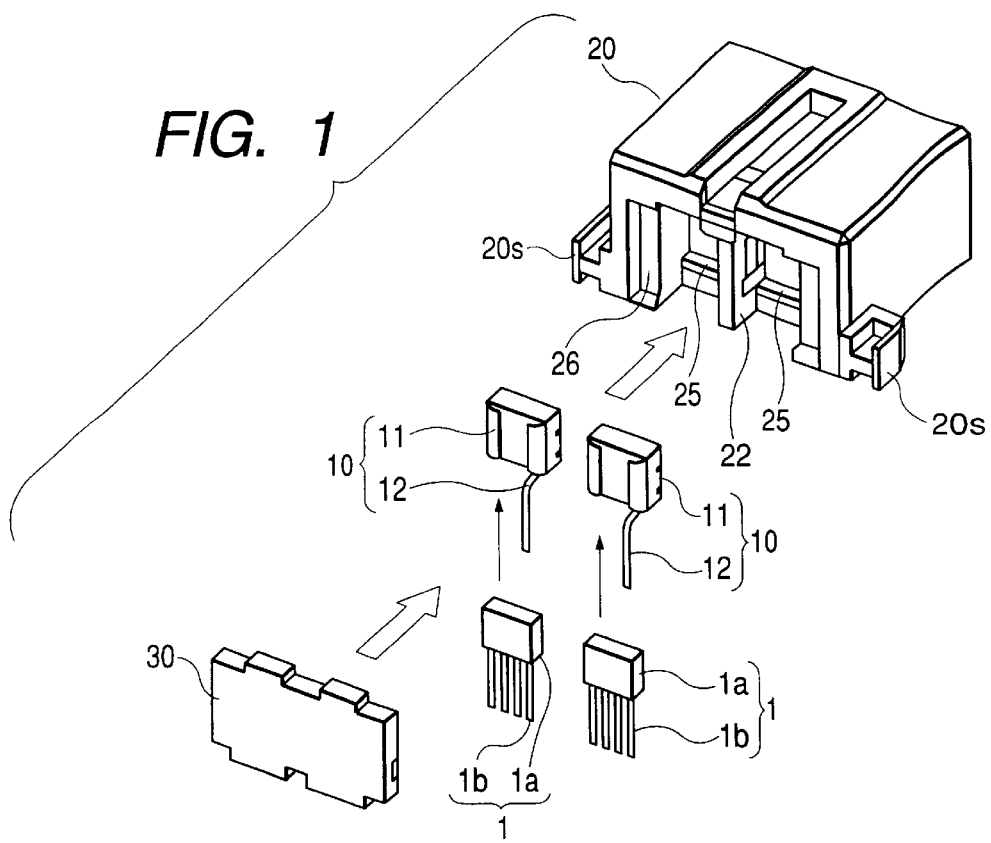
FIG. 1 is a perspective assembly drawing showing an optical connector according to a first embodiment of the present invention.
Figure 2:
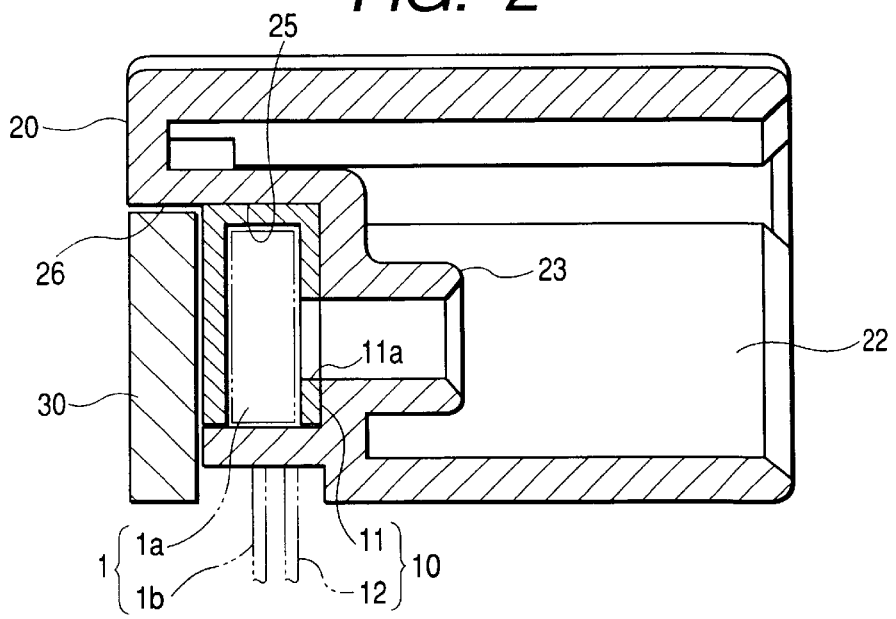
FIG. 2 is across-sectional view of the optical connector.

An optical connector according to a first embodiment of the present invention will be described hereinbelow by reference to FIGS. 1 and 2.

An optical connector comprises shield cases 10, a connector housing member 20, and a heatsink section 30. Each of the shield cases 10 can house an element main body section 1a of an optical element 1. Case storage recesses 25 are formed in the connector housing member 20, and the shield cases 10 are retained and stored in respective case storage recesses 25. The heatsink section 30 is incorporated into the connector housing member 20 while remaining in contact with the shield cases 10 and being exposed to the outside of the connector housing member 20.

The optical connector employed in the present embodiment is described as a double-pole-type optical connector having a pair of built-in optical elements 1. The same also applies to a single-pole-type optical element having a single built-in optical element 1 or a three-pole-type optical element having three or more optical elements 1 incorporated therein.

Respective constituent elements will be described specifically. Each of the shield cases 10 is formed by means of punching conductive material; e.g., metal plate material of brass, phosphor bronze, stainless steel, or nickel silver (NISIL), and bending the thus-punched piece. The shield case 10 comprises a case main body section 11 capable of housing the element main body section 1a of the optical element 1, and a lead section 12 extending downward from the case main body section 11.

The case main body section 11 is formed into substantially the shape of a housing having an open bottom. When the element main body section 1a of the optical element 1 is inserted into the case main body section 11 from the open bottom, the entirety of the element main body section 1a is housed in the case main body section 11. In this state, the entirety of the element main body section 1a is covered with the case main body section 11. As will be described, the lead section 12 is grounded, as required, thereby electromagnetically shielding the optical element 1. A construction for grounding the case main body section 11 is not limited to that described above. For instance, the case main body section 11 may be soldered directly to a trace for grounding purpose printed on a board.

A window section 11a is formed at the front side of the case main body section 11. A light-receiving surface or light-emitting surface provided on the front side of the element main body section 1a faces the outside through the window section 11a.

The lead section 12 extends downward from the edge of the bottom opening of the case main body section 11. As mentioned above, a lead section 1b—which extends downward from the element main body section 1a while the element main body section 1a is housed in the case main body section 11—extends downward from the bottom opening of the case main body section 11. As will be described later, the lead sections 1b and 12 can be soldered to predetermined traces formed on an unillustrated board.

The connector housing member 20 is molded from resin into a substantially angular cylindrical member which is flat in a transverse direction thereof. A partition wall section 22 is provided at the transverse center of the connector housing member 20, thus partitioning the inside of the connector housing member 20. A cylindrical ferrule guide section 23 is formed in substantially an axial center of each of a pair of cylindrical internal spaces partitioned by the partition wall section 22 (see FIG. 2). A pair of case storage recesses 25 capable of holding and storing the respective shield cases 10 are formed at the rear of the respective ferrule guide sections 23.

Each of the case storage recesses 25 is open in the rear and bottom surfaces of the connector housing member 20. openings in the rear surface of the connector housing member 20 are open to a common heatsink storage opening section 26 formed at the rear of those openings. The case main body section 11 of each shield case 10 is inserted into a corresponding case storage recess 25 from the rear opening through the heatsink storage opening section 26. While the light-receiving or light-emitting surface of the optical element 1 stored in each shield case 10 faces the ferule guide section 23 via the window 11a, the case main body section 11 of each shield case 10 is housed in a corresponding case storage recess 25. At this time, the lead section 12 of each shield case 10 and the lead section 1b of each optical element 1 extend downward beyond the connector housing member 20 by way of the bottom opening of each case storage recess 25. While the optical connector is mounted on the board, the lead section 12 is grounded to a trace for grounding purpose routed on the board, by means of soldering. The lead section 1b is electrically connected to a predetermined trace routed on the board, as required, by means of soldering. More specifically, the connector housing member 20 itself is screw-fastened to the board, by way of screw lock sections 20s projecting from the respective side surfaces of the connector housing member 20.

When the optical connector is connected to an unillustrated mating optical connector while the shield cases 10 are retained in the respective case storage recesses 25, ferules of the mating optical connector are fitted and guided deep into the ferule guide sections 23. The end faces of optical fibers retained and housed in the ferules oppose the light-emitting or light-receiving surfaces of the optical elements situated in deep positions in the ferule guide sections 23, thereby optically coupling the optical fibers and the optical elements 1.

The heatsink section 30 is formed from material which is superior in heat conductivity to that constituting the connector housing member 20; for example, metal or the like. The heatsink section 30 is provided on and across the back of the shield cases 10. While being exposed from the connector housing member 20, the heatsink section 30 is incorporated into the connector housing member 20.

More specifically, the heatsink section 30 is formed into a substantially-rectangular-parallelepiped plate matching the shape of the heatsink storage opening section 26. The heatsink section 30 is fitted into the heatsink storage opening section 26. The front surface of the heatsink section 30 is brought into surface contact with the entire rear surfaces of the case main body sections 11 of the shield cases 10 through the rear openings of the respective case storage recess sections 25. The rear surfaces of the heatsink sections 30 are exposed at the rear surface of the connector housing member 20. The heatsink section 30 is retained in the heatsink storage opening section 26, by means of unillustrated retaining means utilizing; e.g., a known engagement mechanism. In this way, when the heatsink section 30 is incorporated into the connector housing member 20, the heatsink section 30 holds down and retains the shield cases 10 in the corresponding case storage recesses 25 from behind.

Since the optical elements 1 are housed in the shield cases 10, the optical connector having the foregoing construction has superior noise resistance. Heat developing in the optical element 1 propagates to the shield cases 10 and the heatsink section 30 remaining in contact therewith. The heat is dissipated to the outside from an exposed portion of the heatsink section 30. Hence, the optical connector has superior performance in dissipating heat from the optical elements 1.

Since the optical connector has superior noise resistance or a heat dissipation characteristic, the optical elements 1 can operate at higher speed (a higher frequency) stably.

Particularly, since the heatsink section 30 is provided across the back of the shield cases 10, the heat developing in the optical elements 1 readily propagates to the heatsink section 30 through the shield cases 10. Hence, the optical connector is greatly superior in heat dissipation.

When the heatsink section 30 is incorporated into the connector housing member 20, each shield case 10 is held down and retained in the corresponding case storage recess 25 from behind. Hence, the shield cases 10 can be fixedly held in the connector housing member 20 without play.

In the embodiment, the heatsink section 30 is provided on the back of the connector housing member 20. However, the heatsink section 30 may be provided on the side or top of the connector housing member 20.

Figure 3:
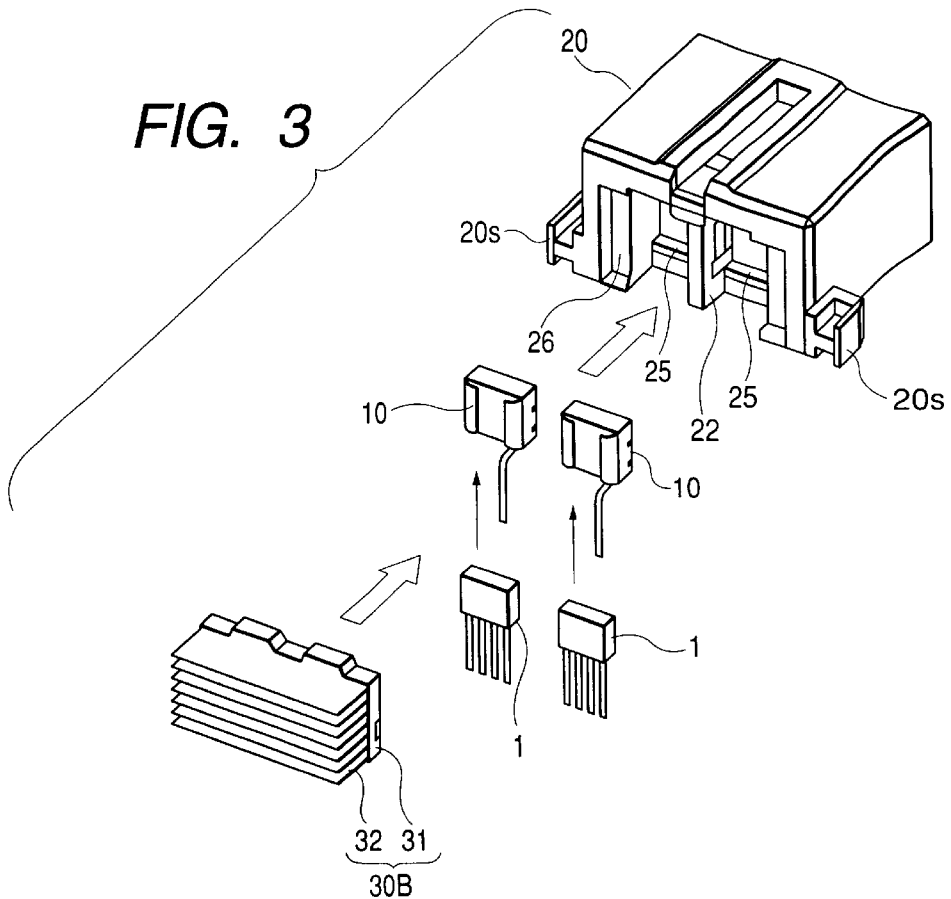
FIG. 3 is a perspective assembly drawing showing a modification of the optical connector.

As described in connection with a modification shown in FIG. 3, there may be used a heatsink section 30B having a plurality of heatsink projections 32 protruding outward.

The heatsink section 30B has a plate section 31 to be fitted into the opening section 26 so as to come into contact with the respective shield cases 10; and heatsink projections 32 projecting from the rear surface of the plate section 31 so as to extend outward.

The heatsink projections 32 have the function of increasing the surface area of an outwardly-exposed area of the heatsink section 30B, thereby enhancing a heat radiating effect.

A possible shape having a high radiating effect can be embodied as the heatsink projections 32 formed into a plurality of projecting fins arranged in parallel, or the heatsink projections 32 formed into a plurality of bristling columns.

Even in the case of an optical connector using the heatsink section 30B, the heat developing in the optical elements 1 propagates, through the shield cases 10, to the heatsink section 30B remaining in contact with the shield cases 10. By means of the working effect of the heatsink projections 32, the heatsink section 30B becomes apt to dissipate heat to the outside and attain superior performance in dissipating heat from the optical elements 1.

The present modification is based on the principle that the effect of radiation of the heatsink section 30B is enhanced by means of increasing the area of the heatsink section 30 exposed to outside air. Even if the heatsink section 30B is formed from the same resin as that of the connector housing member 20, the above-described effect can be yielded. As in the case of the previous embodiment, when the heatsink section 30B is formed from material possessing superior heat conductivity, such as metal or the like, the radiating effect of the heatsink 30B becomes greatly superior.

In the embodiment and the modification thereof, the heatsink 30 (30B) may be formed integrally with the shield cases 10, 10.

In the embodiment and the modification thereof, heat of the optical elements 1 is dissipated through the heatsink section 30. The heatsink section 30 may be omitted, and the shield cases 10 may be exposed directly to the outside through the rear surface of the connector housing member 20.

[Second Embodiment]

Figure 4:
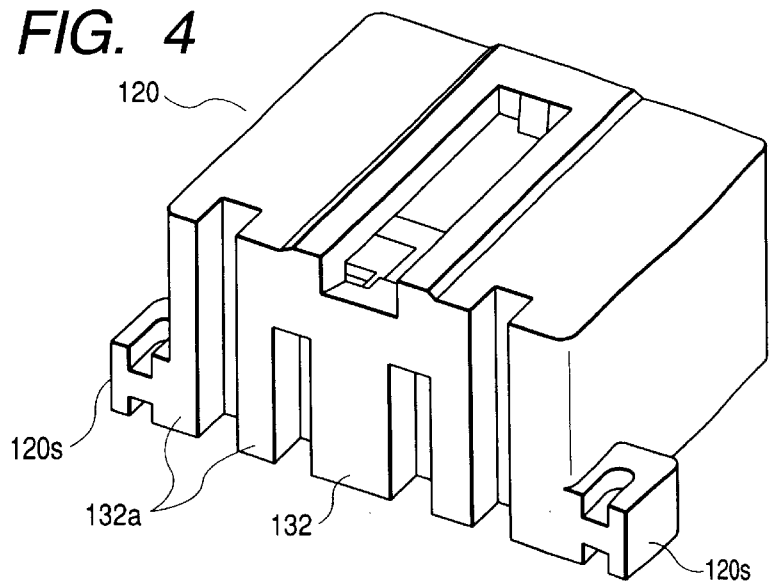
FIG. 4 is a perspective vie showing an optical connector according to a second embodiment of the present invention.
Figure 5:
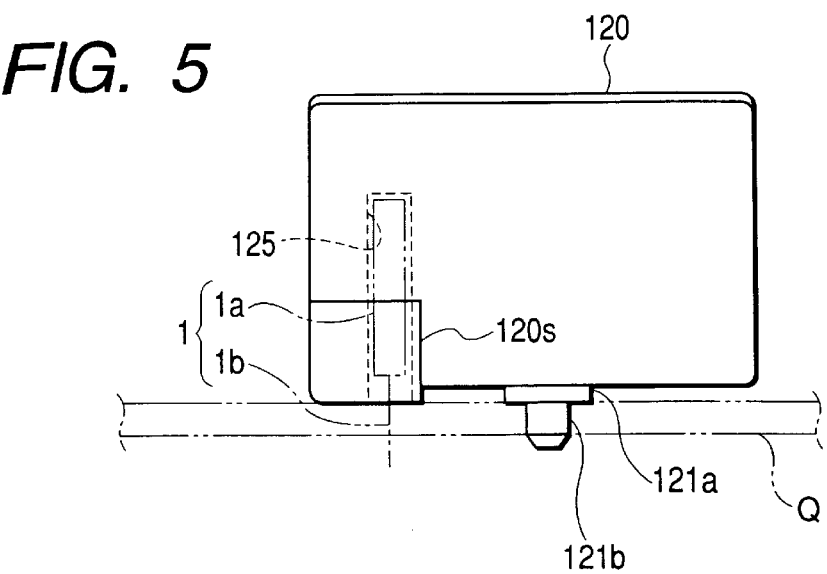
FIG. 5 is a side view showing the optical connector.
Figure 6:
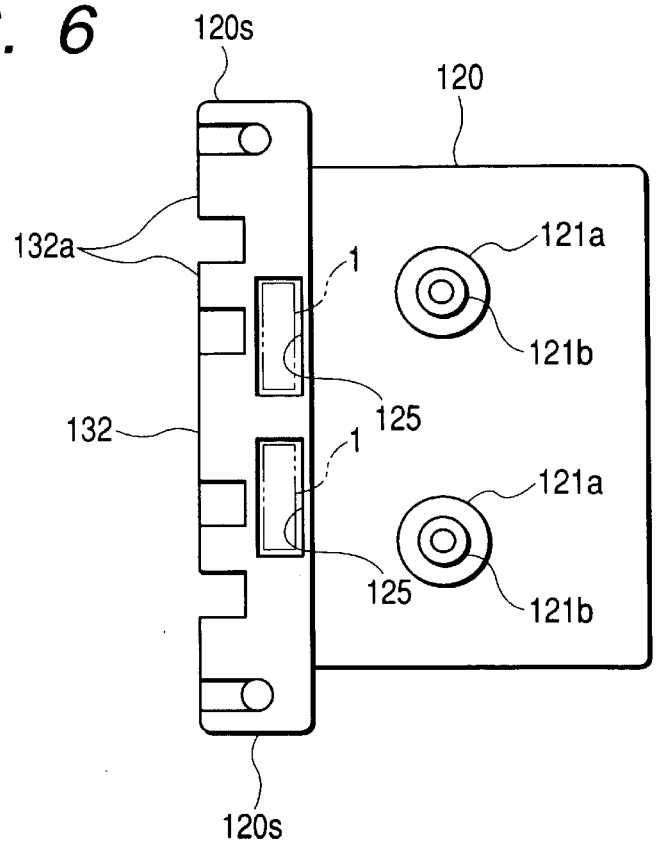
FIG. 6 is a bottom view showing the optical connector.

An optical connector according to a second embodiment of the present invention will now be described by reference to FIGS. 4 through 6.

The optical connector can hold the optical elements 1 in a connector housing 120. The entirety of the connector housing 120 is formed from metal.

The optical connector housing 120 schematically corresponds to a single piece into which the connector housing member 20 and the heatsink section 30, both described in connection with the first modification of the first embodiment, are assembled, and the entirety of the optical connector housing 120 is formed from metal.

More specifically, the connector housing 120 is formed from metal, such as aluminum or aluminum alloy. A pair of storage recesses 125—into which the element main body sections 1a of the optical elements 1, each element consisting of a light-emitting or light-receiving element, can be inserted directly—are spaced side by side in a transverse direction of the connector housing 120.

While substantially-parallelepiped element main body sections 1a of the pair of optical elements 1 are fitted and housed in the respective storage recesses 125, the lead terminals 1b of the optical elements 1 project downward from the storage recesses 125. In each storage recess 125, the outer circumferential surface of the element main body section 1a is in substantially intimate contact with an inner circumferential surface of the storage recess 125.

While the element main body sections 1a are housed in the respective storage recesses 125, cylindrical ferule guide sections are formed so as to correspond to optically-coupled surfaces of the optical elements 1 (see FIG. 2 described in connection with the first embodiment).

A heatsink section 132 is formed on the exterior rear surface of the connector housing 120, and a plurality of ridge-shaped heatsink projections 132a are formed on the exterior surface so as to be spaced apart from each other at appropriate intervals in a transverse direction and to extend vertically.

A mount section 120s having a screw hole is formed in a lower portion of either side surface at the rear part of the connector housing 120 so as to jut from either side surface, and the screw holes are fastened onto a board Q by use of screws.

While the mount sections 120s are connected to a trace for grounding purpose routed on the board Q, screws are inserted into the board Q from below and screw-engaged with the mount sections 120s. Thus, the optical connector is mounted on the board Q. At this time, the bottoms of the mount sections 120s and the area located between the mount sections 120s remain in surface contact with the ground trace on the board Q, whereby the connector housing 120 is grounded.

In the present embodiment, a pair of contact base sections 121a, each having the shape of a substantially circular base, are formed on the underside of a front portion of the connector housing 120, and a positioning projection 121b is formed so as to protrude from each of the contact base sections 121a.

While the optical connector is fixedly mounted on the board Q, the positioning projections 121b are fitted into positioning holes formed in the board Q, whereby the optical connector is positioned. The bottom surfaces of the contact base sections 121a remain in surface contact with ground traces formed on the board Q, thereby grounding the connector housing 120.

The connector housing 120, except for the mount sections 120s, the portion of the connector housing 120 located between the mount sections 120s, and the contact bases 121b, is mounted while being levitated from the upper surface of the board Q. Although the connector housing 120 itself is formed from metal material, limitations can be imposed on the area over which the connector housing 120 is to be brought into contact with the board Q, thereby effectively preventing occurrence of a short-circuit in the traces routed on the board Q.

The element main body sections 1a of the optical elements 1 are housed in the corresponding storage recesses 125 of the connector housing 120 wholly formed from metal material. Hence, all the heat in the connector housing 120 can be dissipated, thereby effectively dissipating the heat developing in the optical elements 1.

The heatsink section 132 is provided in the vicinity of the area where the optical elements 1 are to be disposed. Even in this regard, heat can be dissipated effectively.

The connector housing 120 is grounded to the ground trace provided on the board Q, by way of the mount sections 120s and the contact bases 121a. Hence, the connector housing 120 exhibits superior noise resistance. Particularly, the element main body sections of the optical elements 1 are fully enclosed in the connector housing 120. Even in this respect, the connector housing 120 exhibits superior noise resistance.

While being stored in a shield case, such as the shield case 10 employed in the first embodiment, the optical elements 1 may be housed in the connector housing 120. Here, elimination of the shield case results in realization of a simpler construction.

[Third Embodiment]

An optical connector according to a third embodiment of the present invention will now be described by reference to FIGS. 7 through 10.

The optical connector can be mounted on the board Q. The optical connector comprises a connector housing member 20C, a case main body section 11C, and a shield case 10C. A case storage recess 25C is formed in the connector housing member 20C. The case main body section 11C is housed in the connector housing member 20C while storing the optical element main body section 1a of the optical element 1. A plurality of lead sections 12C extend from the case main body section 11C to the outside of the connector housing member 20C and can be connected to a ground trace P formed on the board Q.

The optical connector employed in the present embodiment is described as a single-pole-type optical connector having one built-in optical element 1. The same also applies to the optical connector having two poles described in connection with the first embodiment and to an optical connector having three or more poles.

Respective constituent elements will be described specifically. A shield case 10C is formed by means of punching conductive material; e.g., metal plate material of brass, phosphor bronze, stainless steel, or nickel silver (NISIL), as required, and bending the thus-punched piece. The shield case 10C comprises a case main body section 11C capable of housing the element main body section 1a of the optical element 1, and a plurality of lead sections 12C extending downward from the case main body section 11C.

The case main body section 11C is formed into substantially the shape of a housing having an open bottom. When the element main body section 1a of the optical element 1 is inserted into the case main body section 11C from the open bottom thereof, the entirety of the element main body section 1a is housed in the case main body section 11C. In this state, the entirety of the element main body section 1a is covered with the case main body section 11C. As will be described later, a lead section 12C is grounded by means of connection to the ground trace P formed on the board Q, thereby electromagnetically shielding the optical element 1. A window section 11Ca is formed at the front side of the case main body section 11C. A light-receiving surface or light-emitting surface provided on the front side of the element main body section 1a faces the outside through the window section 11Ca.

A plurality of lead sections 12C extend downward from the edge of the bottom opening of the case main body section 11C. Each of the lead sections 12C is bent so as to extend directly below after having extended slightly from the case main body section 11C. Each of the lead sections 12C can be connected to the ground trace P without involvement of interference with areas in which the lead sections 1b of the element main body sections 1a are to be connected to predetermined traces of the board Q. As mentioned above, the lead section 1b extending downward from the element main body section 1a extends downward from the bottom opening of the case main body section 11C while the element main body section 1a is housed in the corresponding case main body section 11C.

The ground trace P to be formed on the board Q is preferably formed into a geometry having a sufficient surface area, so as to become wider than traces located around the trace P such that the heat propagating through the lead sections 12C is readily dissipated surroundings while the lead sections 12C remain connected to the trace P.

Figure 7:
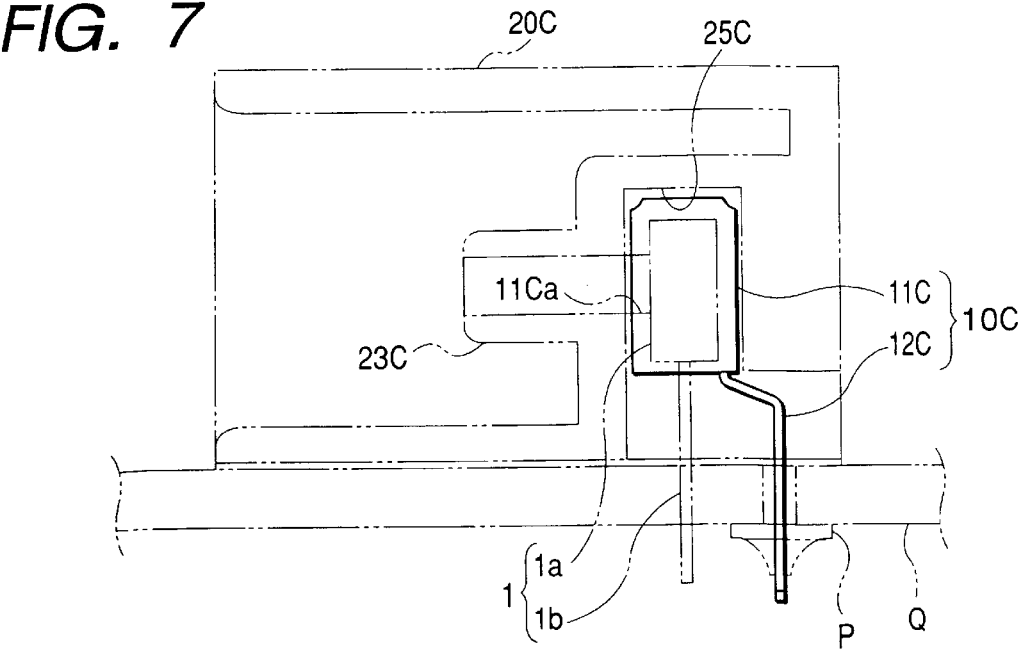
FIG. 7 is a cross-sectional view showing an optical connector according to a third embodiment of the present invention.
Figure 9:
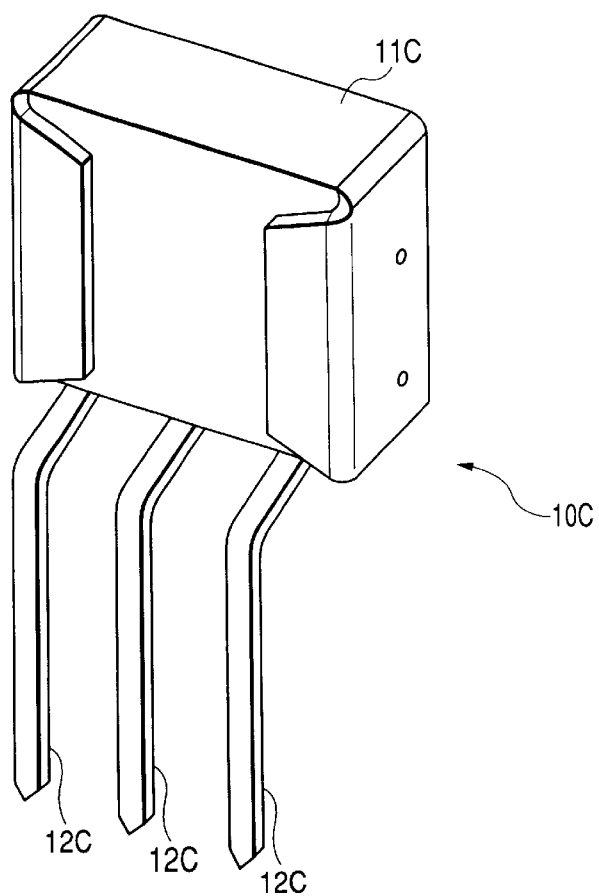
FIG. 9 is a perspective view showing the shield case of the optical connector.
Figure 8A:
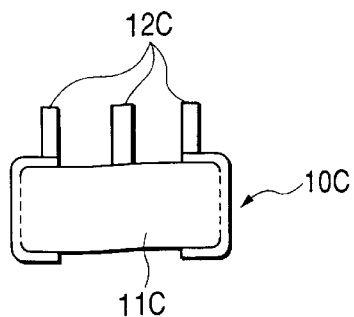
FIG. 8A is a plan view showing a shield case for the optical connector.
Figure 8B:
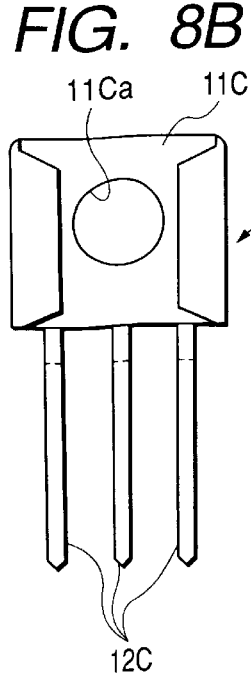
FIG. 8B is a front view showing the shield case.
Figure 8D:
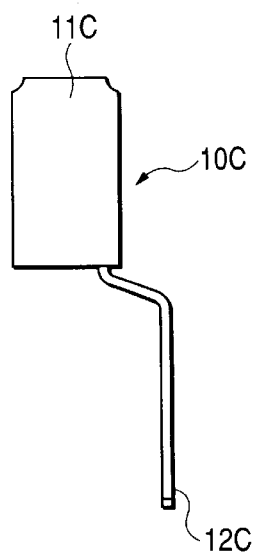
FIG. 8D is a side view showing the shield case.
Figure 8E:
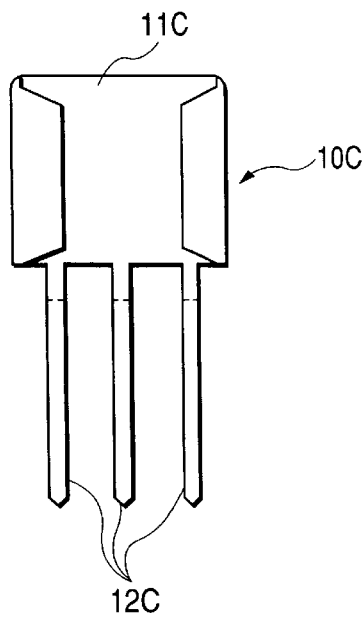
FIG. 8E is a rear view showing the shield case.
Figure 8C:
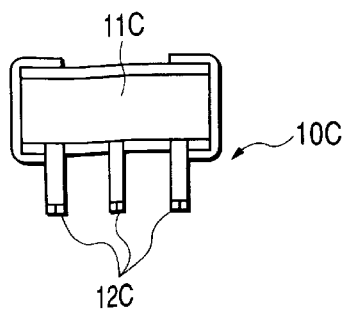
FIG. 8C is a bottom view showing the shield case.
Figure 10:
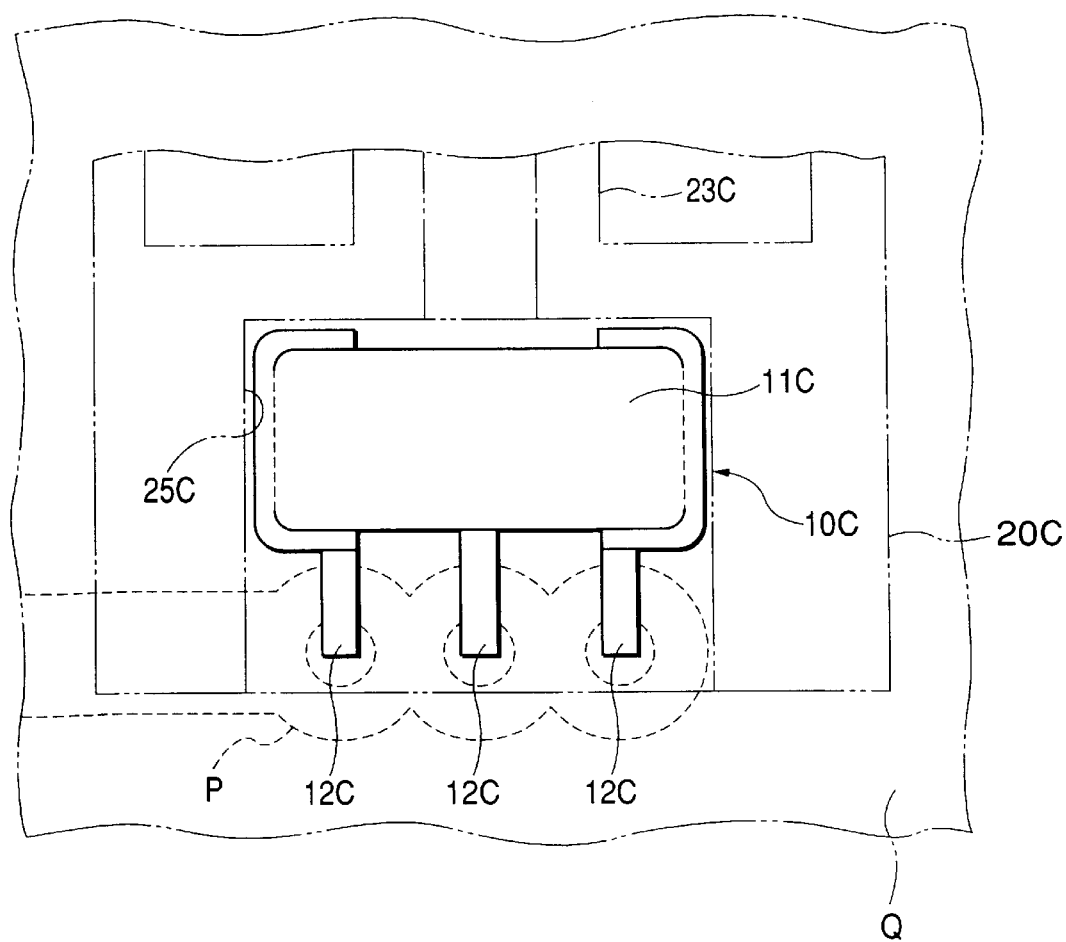
FIG. 10 is a fragmentary cross-sectional plane view showing the optical connector when the connector is mounted on a board.

As shown in FIGS. 7 and 10, a connector housing member 20C is molded from resin into a substantially angular cylindrical member. A cylindrical ferrule guide section 23C is formed in substantially the axial center of a cylindrical internal space of the connector housing member 20C. A case storage recess 25C capable of holding and storing the shield case 10C is formed at the rear of the ferrule guide section 23C.

The case storage recess 25C is opened in the bottom of the connector housing member 20C. The case main body section 11C of the shield case 10C is inserted into a case storage recess 25C from the bottom opening of the case main body section 11C. Then, while the light-receiving or light-emitting surface of the optical element 1 stored in the shield case 10C faces the ferrule guide section 23C through the window 11Ca, the case main body section 11C of the shield case 10C is housed in the case storage recess 25C. At this time, the lead sections 12C of each shield case 10C and the lead section 1b of the optical element 1 extend downward beyond the connector housing member 20C by way of the bottom opening of each case storage recess 25C. When the optical connector is mounted on the board Q, the lead sections 12C are grounded to ground traces P for grounding purpose routed on the board Q, by means of soldering. The lead section 1b is electrically connected to a predetermined trace routed on the board Q, as required, by means of soldering. More specifically, the connector housing member 20C itself is screw-fastened to the board Q, by way of fastening means such as screws.

The lead sections 12C can be connected to the ground trace P through any of various techniques which facilitate transfer of heat, such as welding, or through soldering.

When the optical connector is connected to an unillustrated mating optical connector while the shield cases 10C are retained in the respective case storage recesses 25C, a ferule of the mating optical connector is fitted and guided deep into the ferrule guide section 23C. As a result, the end faces of optical fibers retained and housed in the ferule oppose the light-emitting or light-receiving surfaces of the optical elements 1 situated in deep positions in the ferrule guide sections 23C, thereby optically coupling the optical fibers and the optical elements 1.

Since the element main body section 1a of the optical element 1 is housed in the shield case 10C, the optical or the shield case 10C having the foregoing construction exhibits superior noise resistance. The case main body section 11C of the shield case 10C is provided with a plurality of lead sections 12C which extend to the outside of the connector housing member 20C and can be connected to the ground trace P formed on the board Q. The heat developing in the optical elements 1 propagates to the ground trace P via the plurality of lead sections 12C, thus escaping to the outside. Thus, the optical connector or the shield case 10C is superior in thermal dissipation of the optical elements 1.

The shield case 10C is connected to the ground trace P via the plurality of lead sections 12C. Hence, resistance arising between the shield case 10C and the trace P is minimized, and the noise inflicted on the shield case 10C can readily escape to the trace P. Thus, the shield case 10C can exhibit a sufficient shielding effect.

In the third embodiment, the plurality of lead sections 12C are formed in the edge of the bottom opening of the case main body section 11C; that is, a rear portion of the edge. However, the lead sections 12C may be formed in a side or front portion of the edge of the bottom opening of the case main body section 11C. In short, the only requirement is that the plurality of lead sections 12C extend from the case main body section 11C so as to be connectable to the ground trace formed on the board.

If two or more lead sections 12C are available, the optical connector is superior in heat dissipation to a related-art optical connector having a single lead section. If three or more lead sections 12C extend from the case main body section, the only requirement is that two or more of the lead sections 12C be connected to the ground trace. There may exist a so-called unoccupied lead section 12C.

Figure 11:
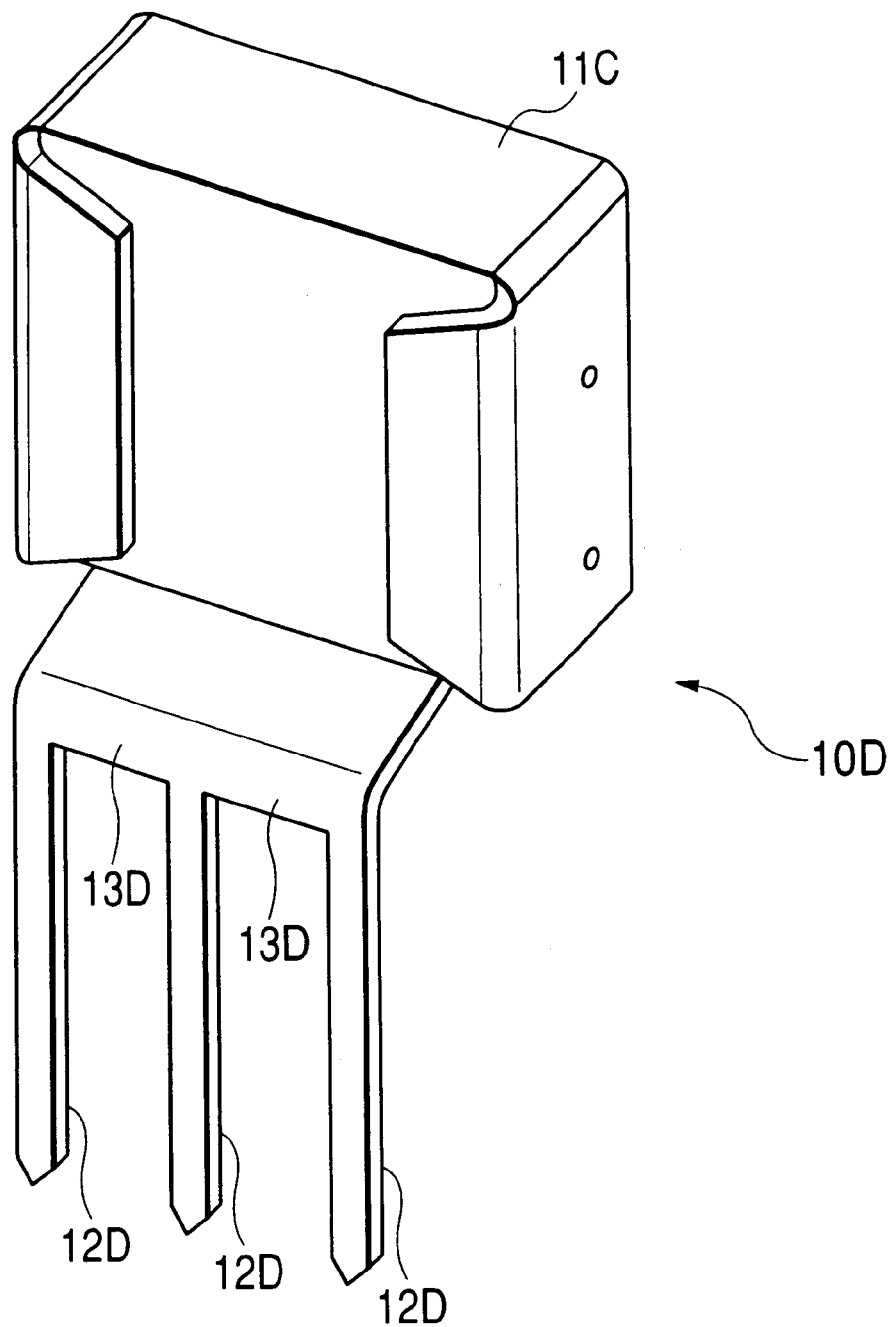
FIG. 11 is a perspective view showing a modification of the optical connector shield case.

As in the case of a shield case 10D shown in FIG. 11, a plurality of lead sections 12D extending from the case main body section 11C may be interconnected by means of an interconnection section 13D in an area before the area in which the lead sections are to be connected to the ground trace P.

[Fourth Embodiment]

An optical connector according to a fourth embodiment of the present invention will now be described, by reference to FIGS. 12 through 14.

In the optical connector, a case storage recess 25E is formed in a connector housing member 20E. An opening 25Eh of the case storage recess 25E is formed in a rear surface of the connector housing member 20E. The shield case 10E housing an element main body section of the optical element is retained and housed in the case storage recess 25E by way of the opening 25Eh. The heat developing in the optical element is dissipated to the outside through the opening 25Eh.

As a result, the element main body section of the optical element is held in the connector housing member 20E while being housed in the shield case 10E. Hence, the optical connector has superior noise resistance.

The heat developing in the optical element is transferred to the shield case 10E, and the heat is then dissipated to the outside via the opening 25Eh. Hence, the optical connector is also superior in heat dissipation. As a construction for dissipating the heat developing in the optical element to the outside through the opening 25Eh, there can be employed a construction in which the rear surface of the shield case 10E is exposed directly to the outside through the opening section 25Eh, or a construction in which a heatsink section having a predetermined radiation function is exposed to the outside through the rear surface of the shield case 10E while being brought in contact with or formed integrally with the rear surface of the shield case 10E through the opening section 25Eh.

In relation to the optical connector, a positioning projection 14 is formed in the shield case 10E in a direction orthogonal to the direction in which insertion to the case storage recess 25E is to be effected. A guide groove section 27 for slidably engaging with the positioning projection 14 is formed in a circumferential wall section extending from the opening 25Eh of the connector housing member 20E to the case storage recess 25E. The positioning projection 14 is slidably engaged with the guide groove section 27, so that the shield case 10E is inserted into the case storage recess 25E while being positioned in at least one direction orthogonal to the direction in which the shield case 10E is to be inserted.

Respective constituent elements will be described in more detail. As in the case of the shield case 10C described in connection with the third embodiment, the shield case 10E schematically comprises a case main body section 11E (corresponding to the case main body section 11C) capable of housing an element main body section of an optical element; and a plurality of lead sections 12E (corresponding to the lead sections 12C) extending from the case main body section 11E. The present embodiment encompasses the case where only one lead section 12E is employed.

Figure 12:
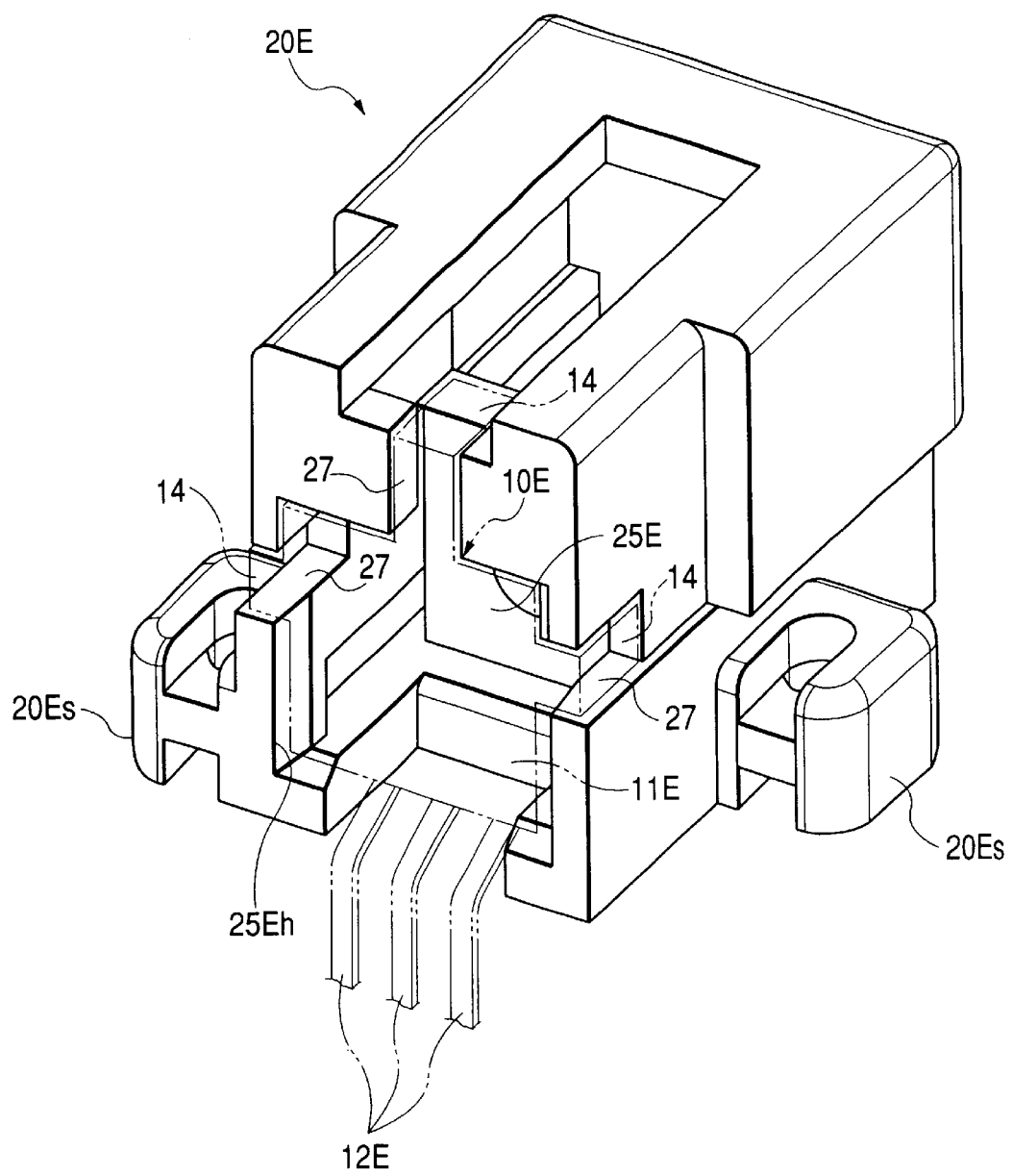
FIG. 12 is a perspective view showing an optical connector according to a fourth embodiment of the present invention.
Figure 13:
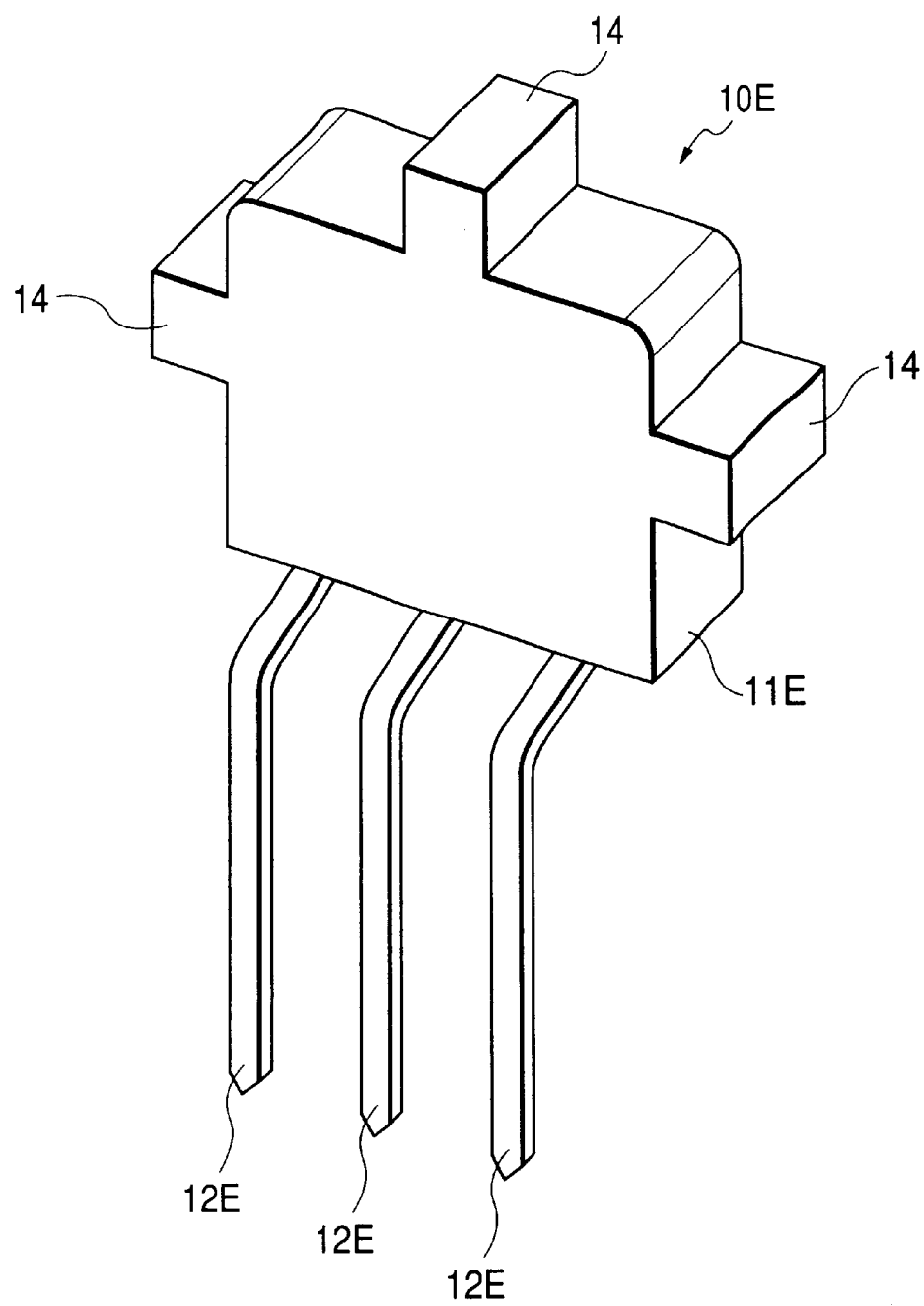
FIG. 13 is a perspective view showing a shield case for the optical connector.
Figure 14A:
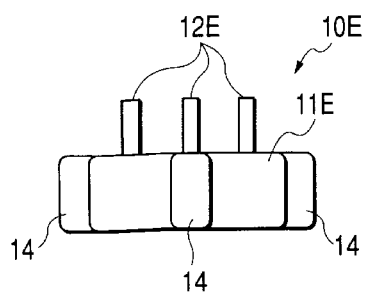
FIG. 14A is a plan view showing a shield case of the optical connector.
Figure 14B:
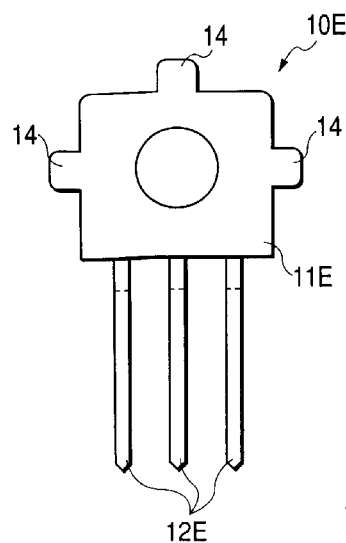
FIG. 14B is a front view showing the shield case.
Figure 14D:
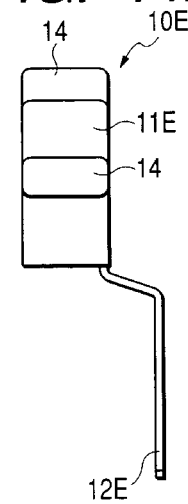
FIG. 14D is a side view showing the shield case.
Figure 14E:
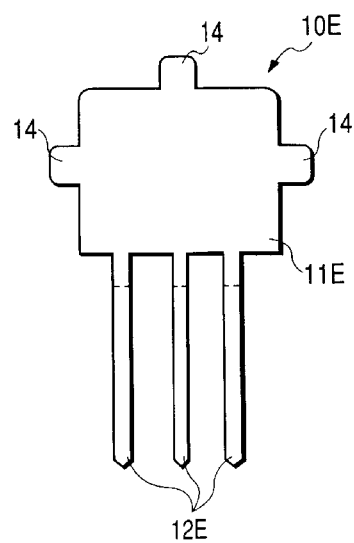
FIG. 14E is a rear view showing the shield case.
Figure 14C:
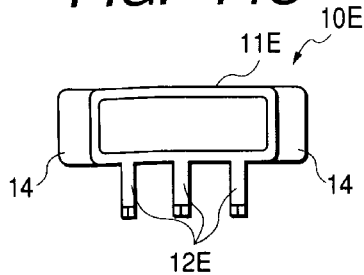
FIG. 14C is a bottom view showing the shield case.
Figure 15A:
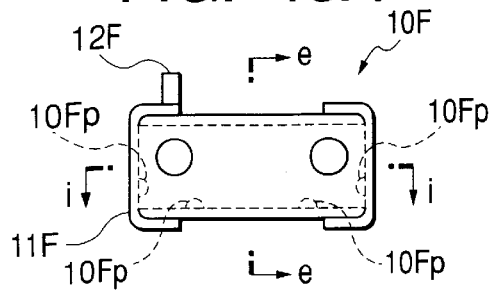
FIG. 15A is a plan view showing a shield case for an optical connector according to the fourth embodiment.
Figure 15B:
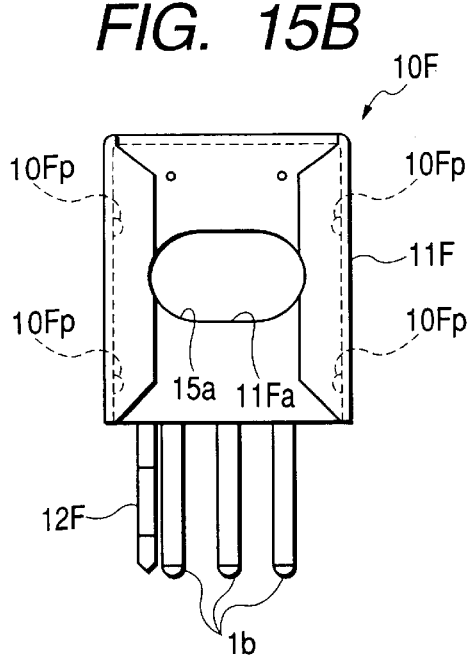
FIG. 15B is a front view showing the shield case.
Figure 15D:
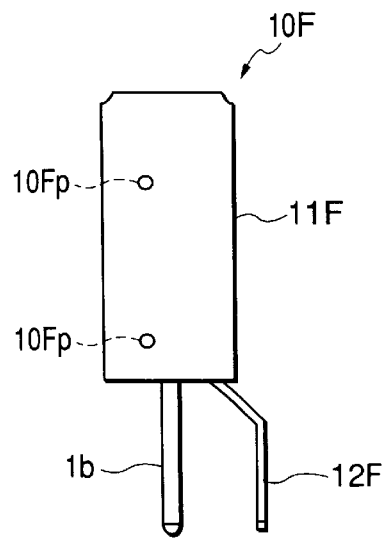
FIG. 15D is a side view showing the shield case.
Figure 15C:
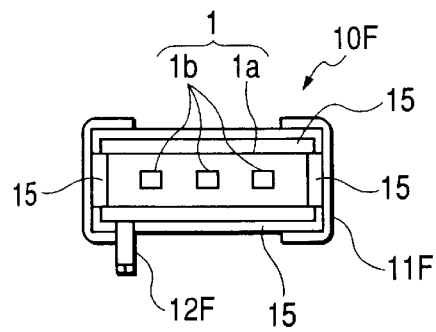
FIG. 15C is a bottom view showing the shield case.
Figure 15E:
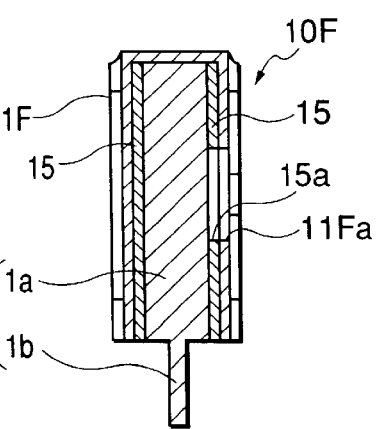
FIG. 15E is a cross-sectional view taken along line e—e shown in FIG. 15A.
Figure 16F:
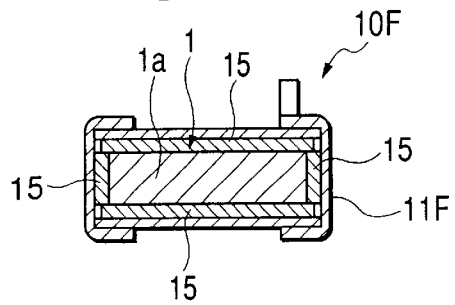
FIG. 16F is a cross-sectional view taken along line f—f shown in FIG. 16G.
Figure 16G:
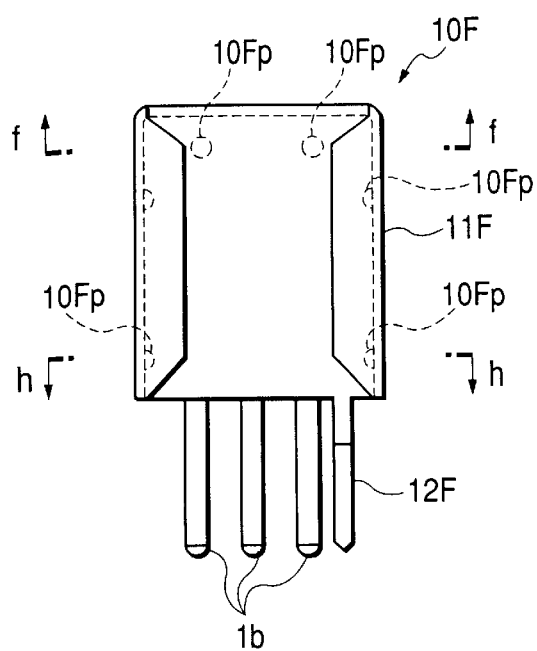
FIG. 16G is a rear view of the shield case.
Figure 16I:
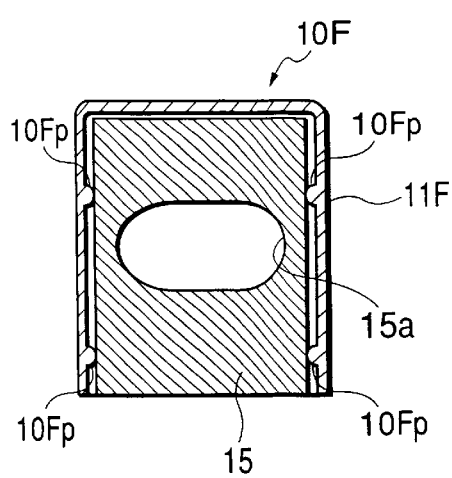
FIG. 16I is a cross-sectional view taken along line i—i shown in FIG. 15A.
Figure 16H:
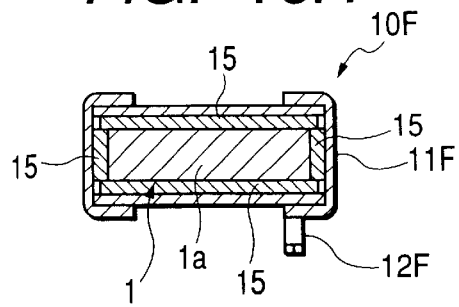
FIG. 16H is a cross-sectional view taken along line h—h shown in FIG. 16G.

As shown in FIG. 12, the connector housing member 20E is molded from resin into a substantially angular cylindrical member. A cylindrical ferrule guide member (omitted from FIG. 12; see FIGS. 2 and 7) is formed in a substantially axial center of the cylindrical internal space within the connector housing 20E. A housing recess section 25E capable of retaining and housing the shield case 10E is formed at the rear of the ferule guide section.

The case storage recess 25E opens in the bottom of the connector housing member 20E. While the element main body section of the optical element is housed in the case main body section 11E of the shield case 10E, the case main body section 11E is inserted into the case storage recess 25E by way of the rear opening 25Eh. Then, while the light-receiving or light-emitting surface of the optical element faces the ferule guide section, the case main body section 11E of the shield case 10E is housed in the case storage recess 25E. When an unillustrated mating optical connector is connected to the optical connector while the shield case 10E is retained and housed in the case storage recess 25E, a ferule of the mating optical connector holding the end of an optical fiber is inserted and guided into the ferule guide section, thereby optically coupling the optical fiber and the optical element.

As in the case of the first through third embodiments, the lead sections 12E of the shield case 10E and the lead sections of the optical element extend downward beyond the connector housing member 20E by way of the bottom opening of each case storage recess 25E. When the optical connector is mounted on the board Q, the lead sections 12E and the lead sections of the optical elements are soldered to predetermined traces formed on the board, as required. Here, the connector housing member 20E itself is screw-fastened to the board, by means of fastening means such as screws, via screw lock sections 20Es provided on both sides of the connector housing member 20E.

In the present embodiment, the rear surface of the shield case 10E is exposed directly to the outside through the opening 25Eh. The heat that has propagated from the optical element to the shield case 10E is dissipated through the exposed portion.

The guide groove section 27 capable of slidably engaging with the positioning projection 14 is formed in a circumferential wall section extending from the opening 25Eh of the connector housing member 20E to the case storage recess 25E. The positioning projection 14 capable of slidably engaging with the guide groove section 27 is formed in the case main body section 11E of the shield case 10E.

In the present embodiment, in relation to the connector housing member 20E, a total of three guide groove sections 27 are formed, in both sides and an upper surface of the circumferential wall section extending from the opening 25Eh to the case storage recess 25E. In relation to the shield case 10E, a total of three positioning projections 14 are formed, in both side surfaces and an upper surface of the case main body section 11E so as to project to the outside.

Each of the guide groove sections 27 is formed in the shape of a slit passing through the case storage recess 25E. Specifically, the guide groove sections 27 are formed so as to extend in the longitudinal direction of the connector housing member 20E; that is, a direction in which the shield case 10E is to be inserted.

Each of the positioning projections 14 is formed into a rectangular-parallelepiped shape which is slightly smaller in width than a corresponding guide groove section 27. The positioning projections 14 are formed so as to be able to slidably fit into corresponding guide groove sections 27.

The shield case 10E is pressed and inserted into the case storage recess 25E through the opening 25Eh by means of fitting the positioning projections 14 into corresponding guide groove sections 27. As a result, the shield case 10E is inserted into the case storage recess 25E while being positioned in the vertical and transverse directions orthogonal to the direction in which the shield case 10E is to be inserted.

As a matter of course, the optical connector having the foregoing construction is superior in terms of noise resistance and heat dissipation of an optical element. Further, the positioning projections 14 are formed in the shield case 10E in a direction orthogonal to the direction in which insertion to the case storage recess 25E is to be effected. Further, the guide groove section 27 capable of slidably engaging with the positioning projection 14 is formed in a circumferential wall section extending from the opening 25Eh of the connector housing member 20E to the case storage recess 25E. The positioning projections 14 are slidably engaged with the guide grooves 27. As a result, the shield case 10E inserted into the case storage recess 25E while being positioned in at least one direction orthogonal to the direction in which the shield case 10E is to be inserted. Thus, the shield case 10E can be accurately positioned in the case storage recess 25E. Particularly, the light-emitting or light-receiving surface of the optical element 1 can be correctly aligned with the ferule guide section.

In the present embodiment, the positioning projection 14 and the guide groove section 27 are provided in groups of three for positioning the shield case 10E in the direction orthogonal to the direction in which the shield case 10E is to be inserted. An upper portion of the shield case 10E is positioned in the horizontal direction, and side portions of the same are positioned in the vertical direction. When the positioning projection 14 and the guide groove section 27 are provided in at least a group of one; i.e., when at least one positioning projection 14 and a corresponding guide groove section 27 are provided, the shield case 10E can be positioned in at least one direction.

In the present embodiment, the guide groove sections 27 are formed into slits which pass through the case storage recess 25E. However, in consideration of the guide function, the guide grooves 27 may be formed into blind grooves.

The guide grooves 27 are formed so as to pass through at least the case storage recess 25E, and the positioning projections 14 are exposed to the outside by way of the through portions while the shield case 10E is housed in the case storage recess 25E. In this situation, the heat that has propagated to the shield case 10E from the optical elements escapes to the outside by way of the exposed portions of the positioning projections 14. Thus, the present embodiment yields the merit of being superior in dissipating heat from optical elements.

[Fifth Embodiment]

An optical connector according to a fifth embodiment of the present invention will now be described by reference to FIGS. 15A through 16H.

While the element main body section 1a of the optical element 1 is housed in a shield case 10F, the optical connector is incorporated into the connector housing member. Heat developing in the optical element 1 is to be dissipated through the shield case 10F.

Conceivable constructions for dissipating heat from the optical element 1 by way of the shield case 10F include the constructions that have been described in connection with the first, third, and fourth embodiments.

In relation to the optical connector according to the present embodiment, an elastic member 15 is interposed between the element main body section 1a of the optical element 1 and the case main body section 11F of the shield case 10F capable of housing the element main body section 1a while remaining in intimate contact with at least a portion of an exterior surface of the element main body section 1a and a portion of an interior surface of the case main body section 11F.

More specifically, the shield case 10F comprises a case main body section 11F capable of housing the entirety of the element main body section 1a of the optical element 1, and one or a plurality of lead sections 12F (three lead sections 12F in the present embodiment) extending downward from the case main body section 11F.

The case main body section 11F corresponds to the case main body sections 11, 11C, and 11E described in connection with the first, third, and fourth embodiments. In the present embodiment, the case main body section 11F is retained and housed in an unillustrated connector housing member while housing the element main body section 1a. Here, positioning projections 10Fp are formed in a front plate portion and side plate portions of the case main body section 11F so as to protrude inwardly. The projections 10Fp are engaged with the surface of the elastic member 15 to be described later, thereby positioning and retaining the elastic member 15 and the optical element 1. While the element main body section 1a is housed in the case main body section 11E, the light-receiving or light-emitting surface of the element main body section 1a faces the outside by way of a substantially-oval window section 11Fa formed in the front side of the case main body section 111F.

The lead section 12F corresponds to the lead sections 12, 12C, and 12E described in connection with the first, third, and fourth embodiments. The lead sections 12F extend downward beyond the connector housing member and are connected to the ground trace formed on the board, by means of soldering, while the optical connector is mounted on the board.

The elastic member 15 is formed from conductive, magnetic, and elastic material. The elastic member 15 is interposed between the element main body section 1a of the optical element 1 and the case main body section 11F of the shield case 10F capable of housing the element main body section 1a while remaining in intimate contact with at least a portion of an exterior surface of the element main body section 1a and a portion of an interior surface of the case main body section 11F. As conductive, magnetic, and elastic materials, there are employed substances which are formed by means of mixing, into elastic base material such as rubber, conductive powder such as carbon powder, or a metal filler and magnetic material powder such as ferrite or Sendust.

In the present embodiment, the elastic member 15 is interposed so as to surround four longitudinal sides of the element main body section 1a. More specifically, plate material is cut out so as to match the internal shape of a front plate section of the case main body section 11F, the internal shape of a rear plate section of the same, and the internal shapes of side plate sections of the same, thereby forming the elastic members 15. Then the thus-cut elastic members 15 are interposed between the front surface, rear surface, and side surfaces of the element main body section 1 and the front plate section, rear plate section, and side plate sections of the case main body section 11F.

The following methods would be adopted as an assembly method for interposing the elastic members 15 between the exterior surface of the element main body section 1a and the interior surface of the case main body section 11F. According to one method, the elastic members 15 are affixed to four longitudinal sides of the element main body section 1a beforehand. The element main body section 1a is press-fitted into the case main body section 11F. According to another method, the elastic members 15 are affixed to portions of the case main body section 11F—which are to enclose the surfaces of the element main body section 1a—while the case main body section 11F is in an exploded state. The case main body section 11F is then assembled through folding, and the element main body section 1a is press-fitted into the case main body section 11F.

A window section 15a is formed in a portion of the elastic member 15 provided on the front side of the element main body section 1a, the portion corresponding to the window section 11Fa.

The optical connector or shield case having the foregoing construction is incorporated into the connector housing member while the element main body section 1a is housed in the shield case 10F. As a matter of course, the optical connector or shield case is superior in noise resistance of the optical element 1. In the optical connector which dissipates heat from the optical element 1 by way of the shield case 10F, the elastic members 15 are interposed between the element main body section 1a of the optical element 1 and the case main body section 11F of the shield case 10F capable of housing the element main body section 1a while remaining in intimate contact with at least a portion of an exterior surface of the element main body section 1a and a portion of an interior surface of the case main body section 11F. The elastic members 15, which are usually solid, are superior in heat conductivity to air which would otherwise be present between the element main body section 1a and the case main body section 11F when the elastic members 15 are absent. The heat developing in the optical element 1 is readily transferred to the shield case 10F by way of the elastic members 15, and the heat is then dissipated to the outside from the shield case 10F. Thus, the optical connector or shield case having the foregoing construction is also superior in heat dissipation of the optical element 1.

When only an improvement in transfer of heat from the element main body section 1a to the shield case 10F is sought, use of the elastic members 15 having the property of coming into intimate contact with the surface of the element main body section 1a or that of the case main body section 11F is sufficient.

In the present embodiment, the elastic members 15 are formed from conductive, magnetic, and elastic material (or elastic material having conductivity and a magnetic property) Then, the following advantage can be yielded.

More specifically, the shield case 10F housing the optical element 1 is constructed such that the light-emitting or light-receiving surface of the optical element 1 faces the outside. Hence, the window section 11Fa is indispensable for the shield case 10F. However, external noise may induce an eddy current in the conductive portion of the edge of the window section 11Fa. This eddy current may in turn induce radiation of an electromagnetic wave. Further, the optical element 1 itself induces an electromagnetic wave. Particularly, an electromagnetic wave induced by high-frequency operation is subjected to irregular reflection within the space of the case main body section 11F.

By means of imparting conductivity and a magnetic property to the elastic members 15, the elastic members 15 absorb the electromagnetic wave radiated from the edge of the window section 11Fa and the electromagnetic wave induced by the optical element 1, thereby preventing irregular reflection of an electromagnetic wave. Particularly, by means of imparting a magnetic property to the elastic members 15, the elastic members 15 effectively exhibit an electromagnetic wave absorption effect, thereby preventing reflection of an electromagnetic wave (entrance noise), which would otherwise arise on the surfaces of the elastic members 15, and suppressing a high-frequency current developing in the surface of the shield case 10F to thereby prevent re-radiation of noise.

In the present embodiment, as a result of interposition of the elastic members 15 between the element main body section 1a and the case main body section 11F, in addition to the radiating effect and electromagnetic wave absorption effect of the optical element 1, mechanical and thermal vibrations imposed on the shield case 10F are absorbed, thereby preventing occurrence of positional displacement of the element main body section 1a. Hence, there is also yielded an advantage of the element main body section 1a being intimately and fixedly situated in an accurate position within the case main body section 11F.

The elastic members 15 absorb mechanical and thermal natural vibrations arising from a difference between the shield case 10F and the optical element 1 in terms of material, dimension, geometry, and a mounting method, thereby preventing fracture of the lead sections 1b and like sections.

As has been described, the element main body section of the optical element is housed in the shield case, and hence the optical connector according to the present invention has superior noise resistance. The heatsink section is provided across the rear surface of the shield case and is incorporated into the connector housing member while being exposed to the outside of the connector housing member. Hence, heat developing in an optical element readily propagates to the heatsink section from the shield case, and the heat escapes to the outside from the heat heatsink section. Hence, the optical connector is also superior in heat dissipation of the optical element. Particularly, the heatsink section is provided across the rear surface of the shield case, and hence the heat developing in the optical element propagates to the heatsink section from the shield case. The optical connector according to the present invention has a superior heat dissipation characteristic.

In relation to the optical connector, the heatsink section is incorporated into the connector housing member. The shield case is held down and retained in the case storage recess from behind. As a result, the shield case can be fixedly held in the connector housing member without play.

In relation to the optical connector according to the present invention, the entirety of the connector housing having an element main body section of the optical element housed therein is made of metal material. The optical connector has superior noise resistance, and heat developing in the optical element propagates to the metal connector housing, thus readily escaping to the outside. The optical connector according to the present invention has a superior heat dissipation characteristic.

The element main body section of the optical element is housed in the shield case, and hence the optical connector has superior noise resistance. The shield case is housed and retained in the case storage recess formed in the connector housing member while at least the rear surface of the shield case is exposed to the outside. Heat developing in the optical element escapes to the outside from the shield case. Hence, the optical connector according to the present invention is superior in heat dissipation of an optical element.

The element main body section of the optical element is housed in the case main body section of the shield case. Hence, the optical connector has superior noise resistance. The case main body section is provided with a plurality of lead sections which extend outside of the connector housing member and are connectable to the ground trace formed on the board. Heat developing in the optical element is transmitted to the ground trace via the plurality of lead sections, thus escaping to the outside. Thus, the optical connector according to the present invention is superior in heat dissipation of an optical element.

The element main body section of the optical element is housed in the case main body section of the shield case. Hence, the shield case for an optical connector has superior noise resistance. A plurality of lead sections which are connectable to the ground trace formed on the board extend to the case main body section. Hence, heat developing in the optical element propagates to the ground trace via the plurality of lead sections, thus escaping to the outside. Hence, the optical connector shield case according to the present invention is superior also in heat dissipation of an optical element.

The element main body section of the optical element is housed in the case main body section of the shield case. Hence, the optical connector shield case has superior noise resistance. Further, the case storage recess is formed in the connector housing member, and an opening of the case storage recess is formed in the rear surface of the connector housing member. The shield case having the element main body section of the optical element stored therein is housed and retained in the case storage recess by way of the opening. Heat developing in the optical element escapes to the outside by way of the opening. Hence, the optical connector is superior also in heat dissipation of an optical element. In relation to such an optical connector, positioning projections are formed in the shield case in a direction orthogonal to the direction in which insertion to the case storage recess is effected. Further, guide groove sections capable of slidably engaging with the positioning projections are formed in a circumferential wall section extending from the opening of the connector housing member to the case storage recess. The positioning projections are slidably engaged with the guide grooves. As a result, the shield case is inserted into the case storage recess while being positioned in at least one direction orthogonal to the direction in which the shield case is to be inserted. Hence, the shield case can be correctly positioned in the case storage recess.

The guide grooves pass through at least the case storage recess. The positioning projections are exposed to the outside of the connector housing member by way of the through portions while the shield case is housed in the case storage recess. Heat developing in the optical element propagates to the positioning projections from the shield case, thus escaping to the outside. Hence, the shield case is greatly superior in heat dissipation of an optical element.

An optical connector is incorporated into a connector housing member while an element main body section of an optical element is housed in a shield case. Hence, the optical connector is superior in noise resistance of an optical element. Further, the optical connector dissipates heat of the optical element by way of the shield case, and comprises: an elastic member which is interposed between the element main body section of the optical element and a case main body section of the shield case capable of storing the element main body section while remaining in at least partial intimate contact with an exterior surface of the element main body section and with an interior surface of the case main body section. Heat developing in an optical element is transferred to the shield case by way of the elastic member. The heat is readily dissipated through the shield case. Hence, the optical connector is superior also in heat dissipation of an optical element.

When the elastic member is formed from conductive, magnetic, elastic material, there is also yielded an advantage of the elastic member being able to suppress and absorb an electromagnetic wave in the shield case.

The element main body section of the optical element is housed in the case main body section of the shield case. Hence, the optical connector shield case has superior noise resistance. Further, an elastic member is interposed between the element main body section of the optical element and a case main body section of the shield case capable of storing the element main body section while remaining in at least partial intimate contact with an exterior surface of the element main body section and with an interior surface of the case main body section. Heat developing in an optical element is transferred to the shield case by way of the elastic member. The heat is readily dissipated through the shield case. Hence, the optical connector is superior also in heat dissipation of an optical element.

What is claimed is:

1. An optical connector comprising:
   a shield case capable of storing an element main body section of an optical element;
   a connector housing member which retains and stores the shield case in a case storage recess formed therein; and
   a heatsink section which is provided over and across a rear surface of the shield case and is incorporated into the connector housing member while being exposed to the outside from the connector housing member.

2. The optical connector according to claim 1, wherein the heatsink section is incorporated into the connector housing member so as to hold down and retain the shield case in the case storage recess from behind.

3. The optical connector according to claim 1, wherein the heatsink section is formed from material which is superior in heat conductivity to that constituting the connector housing member.

4. The optical connector according to claim 1, wherein the heatsink section is formed from metal material.

5. The optical connector according to claim 1, wherein the heatsink section has a plurality of heatsink projections projecting outwardly.

6. The optical connector according to claim 1, wherein the heatsink section is formed integrally with the shield case.

7. An optical connector capable of storing an element main body section of an optical element in a connector housing, wherein a heatsink section is formed on an exterior rear surface of the connector housing, and the entirety of the connector housing is formed from metal material.

8. he optical connector according to claim 7, wherein an area of the connector housing located behind the optical element has a plurality of heatsink projections projecting outward.

9. The optical connector according to claim 7, wherein a shield case capable of storing the element main body section is retained and housed in the connector housing.

10. An optical connector comprising:
    a shield case capable of storing therein an element main body section of an optical element; and
    a connector housing member which has a case storage recess formed therein and retains and stores the shield case in the case storage recess while at least a rear surface of the connector housing member is exposed to the outside, wherein a heatsink section is formed on the rear surface of the connector housing member.

11. An optical connector capable of being mounted on a board, comprising:
    a connector housing member having a case storage recess formed therein;
    a heatsink section formed on an exterior rear surface of the connector housing member;
    a case main body section which is formed so as to be able to store an element main body section of an optical element and is housed in the connector housing member; and
    a plurality of lead sections which extend from the case main body section toward the outside of the connector housing member and can be connected to a ground trace formed on the board.

12. An optical connector shield case capable of being mounted on a board, comprising:
- a case main body section which is formed so as to be able to store an element main body section of an optical element and is retained and housed in a connector housing member, wherein a heatsink section is formed on an exterior rear surface of the connector housing member; and
- a plurality of lead sections which extend from the case main body section and can be connected to a ground trace formed on the board.

13. An optical connector comprising:
- a case storage recess formed in a connector housing member;
- a rear surface of the connector housing member facing an opening formed in the case storage recess;
- a shield case storing an element main body section of an optical element, wherein the shield case is retained and housed in the case storage recess, and heat developing in the optical element is dissipated to the outside through the opening;
- a positioning projection formed in the shield case in a direction orthogonal to a direction in which insertion to the case storage recess is to be made; and
- a guide groove section which is capable of slidably engaging with the positioning projection and is formed in a circumferential wall section extending from the opening of the connector housing member to the case storage recess;
- wherein the positioning projection is slidably engaged with the guide groove section, so that the shield case is inserted into the case storage recess while being positioned in at least one direction orthogonal to the direction in which the shield case is to be inserted.

14. The optical connector according to claim 13, wherein the guide groove passes through the case storage recess, and while the shield case is housed in the case storage recess, the positioning projection is exposed to the outside of a connector housing member by way of the through portion of the case storage recess.

15. An optical connector which is incorporated into a connector housing member while an element main body section of an optical element is housed in a shield case and which dissipates heat of the optical element by way of the shield case, said connector comprising:
- an elastic member which is interposed between the element main body section of the optical element and a case main body section of the shield case capable of storing the element main body section while remaining in at least partial intimate contact with an exterior surface of the element main body section and with an interior surface of the case main body section.

16. The optical connector according to claim 15, wherein the elastic member is formed from a conductive, magnetic, and elastic material.

17. An optical connector shield case which is incorporated into a connector housing member while an element main body section of an optical element is housed in a shield case and which dissipates heat of the optical element by way of the shield case, said connector comprising:
- an elastic member which is interposed between the element main body section of the optical element and a case main body section of the shield case capable of storing the element main body section while remaining in at least partial intimate contact with an exterior surface of the element main body section and with an interior surface of the case main body section.

* * * * *